Jan. 5, 1965

E. F. SCHILLING 3,164,671

LIGHT VALVE MEDIUM CONTROL

Filed Nov. 21, 1962

INVENTOR:
EDMUND F. SCHILLING,
BY Robert J. Mooney
HIS ATTORNEY.

United States Patent Office 3,164,671
Patented Jan. 5, 1965

3,164,671
LIGHT VALVE MEDIUM CONTROL
Edmund F. Schilling, De Witt, N.Y., assignor to General
Electric Company, a corporation of New York
Filed Nov. 21, 1962, Ser. No. 239,163
6 Claims. (Cl. 178—7.5)

The present invention relates to information display systems which involve modulation of the brightness, or color and brightness, of light by variation of the light diffractive action of a thin layer or film of a viscous medium in accordance with a pattern of electric charge formed thereon under the control of information signals. More particularly the present invention relates to improved means for controlling and regulating the thickness and surface smoothness of the deformable medium in a system of the foregoing character so as to continuously precondition the medium for improved acceptance of information placed thereon.

One information display system of a type to which the present invention relates is described in U.S. patent to W. E. Glenn, Reissue 25,169, commonly assigned herewith. In such a light modulating system the light modulating information is caused to act on the light by the refractive or diffractive action of the disturbed or deformed surface of a thin layer of film of translucent viscous fluid.

Because the modulating information is transferred to the deformable medium entirely in terms of deformation of the surface thereof it is particularly important in order to minimize background or extraneous noise signals and to obtain a good dark field that the surface of the deformable medium be extremely smooth, uniform, and free from extraneous deformations as it enters the area in which deformation producing charges are to be deposited on it. Moreover, effective control of the deformable medium thickness as it enters the deformation area is particularly important from the standpoint of controlling light modulation efficiency and deformation decay time.

One object of the present invention, therefore, is to provide, in apparatus of the character described, improved means for preconditioning the surface of the deformable medium for acceptance of light modulating information to be placed thereon.

Another object is to provide, in apparatus of the character described, means which is compact, relatively inexpensive, reliable, and externally controllable, for regulating the thickness and surface smoothness of the layer of deformable fluid before it enters the deformation or raster area.

Another object is to provide apparatus of the foregoing character wherein the smoothing means provides simultaneous control of heating and temperature-regulation of viscosity of the deformable medium before it enters the charge deposition area.

These and other objects of the present invention will be apparent from the following description taken in conjunction with the accompanying drawing wherein.

Figure 1:
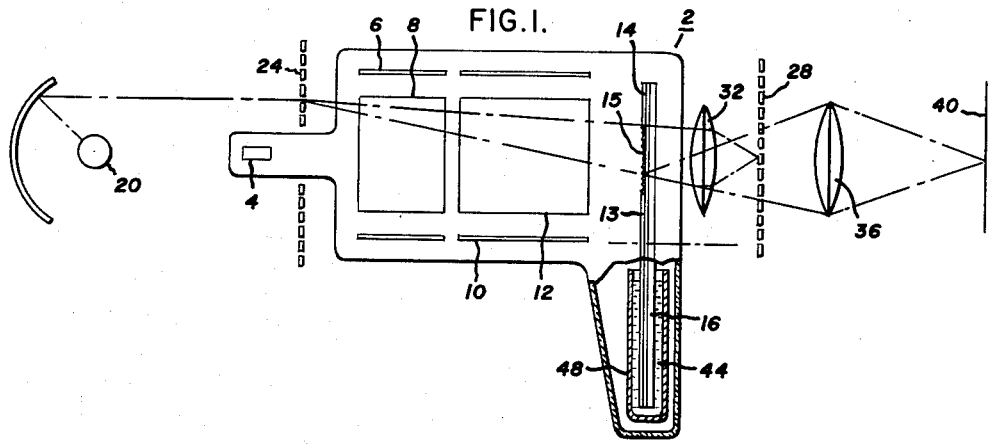
FIGURE 1 is a schematic illustration of an information display system with which the present invention is particularly suitable.

Referring to the drawing, FIGURE 1 is a schematic representation of an information display system of a type with which the present invention is particularly suitable. An envelope 2 forms a vacuum enclosure within which an electron beam is generated by an electron gun 4. The electron beam is controlled in intensity and deflection by appropriate control signals supplied to pairs of acceleration and deflection electrodes 6, 8, 10, 12, and is thereby caused to deposit a desired pattern of electric charge on a film or layer of a deformable viscous medium 13 backed by a transparent conductive coating which serves as an electrode 14. The electrode 14 may provide an accelerating anode potential for the electron beam from electron gun 4 of, for example 10 KV. The deformable medium is carried by a moveable substrate such as a tape, drum, or the like, and shown for example as a rotatable disc 16. The charge-deposition or raster area, in which deformation producing charge patterns are deposited on medium 13, is shown at 15. A suitable optical system is provided for projecting light from a source 20 through the deformable medium 13, the deformable medium providing a variable light diffractive action in accordance with deformation of its surface under the control of deposited electric charge. A cooperating schlieren optical system including a set of input bars and slits 24, a set of output bars and slits 28, a schlieren lens system indicated at 32 for imaging the input slits on the output bars, and an output projection lens system indicated at 36, serves to reproduce on a screen 40 an image corresponding to the information placed by electric charge deposition on the deformable medium 13.

In an information display system of the type illustrated in FIGURE 1 it has been found desirable to continually renew the film or layer 13 of deformable medium in the charge-deposition or raster area 15, and for this purpose the deformable medium-carrying substrate is arranged to be moved so as to continually bring a fresh surface of the deformable medium into the raster area. When as shown, the deformable medium is carried as a liquid on the rotatable disc 16, the disc 16 is arranged for rotation in a pool 44 of the deformable medium contained within a cup 48 and of such depth as to immerse a substantial portion of the lower half of the disc 16. Thus rotation of the disc 16 coats the immersed portion of the deformable medium 13 and continually moves a freshly coated portion of the disc 16 into the electric charge deformation area 15.

Figure 2:
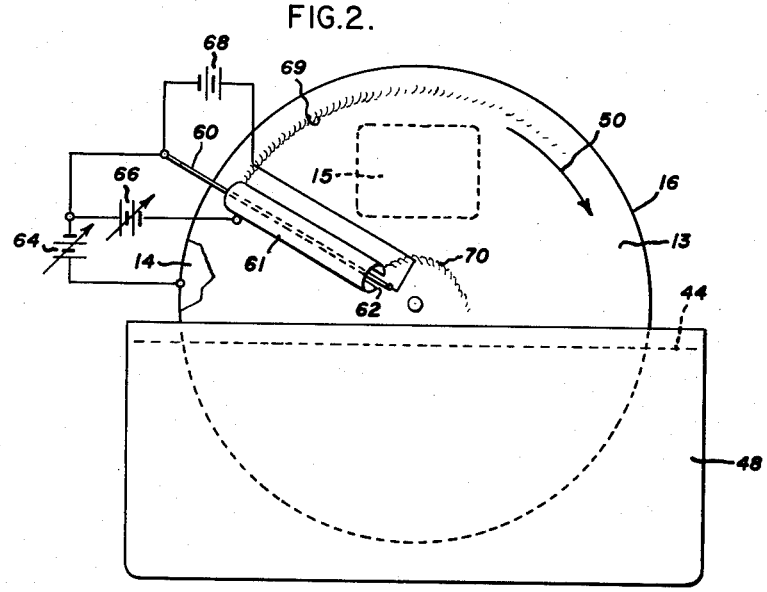
FIGURE 2 is an enlarged diagrammatic view of one form of deformable medium controlling means constructed in accordance with the present invention and suitable for application to display apparatus of the type shown in FIGURE 1.

Referring to FIGURE 2 of the drawing the rotation of the disc 16 in the direction of the arrow 50 draws out of the pool 44 of deformable medium a thin coating of the deformable medium, e.g. having a thickness of a few mils, which is carried by the disc toward the raster area 15. In accordance with the present invention smoothing and control of the thickness of the medium before its entry into the raster area is provided by impingement on the coating of the medium on the disc 16 of a sheet beam of electrons from a linear thermionic emitter, which may be for example a heated wire or filament 60 of a refractory metal such as tungsten, extending radially in closely spaced parallel relation with the layer of medium 13 on the disc 16. Formation of the electrons emitted from the wire 60 into a sheet beam is facilitated by a longitudinally extending control grid 61 partially surrounding the wire 60 but longitudinally slotted so as to provide an opening 62 through which the sheet beam 63 of emitted electrons may emerge toward the fluid layer as best shown in cross section in FIGURE 3. The anode for the emission of the cathode-wire 60 is provided by the transparent conductive electrode 14 which may be maintained at an electron accelerating potential with respect to the cathode 60 by a suitable potential source shown schematically at 64. An adjustable grid bias supply is also shown schematically at 66 for varying the potential of the control grid 61 with respect to the cathode 60. The emitter 60 may be heated to the temperature suitable for thermionic emission therefrom in any suitable manner, such as by direct resistance heating by passage of electric current therethrough from a potential source 68.

Figure 3:
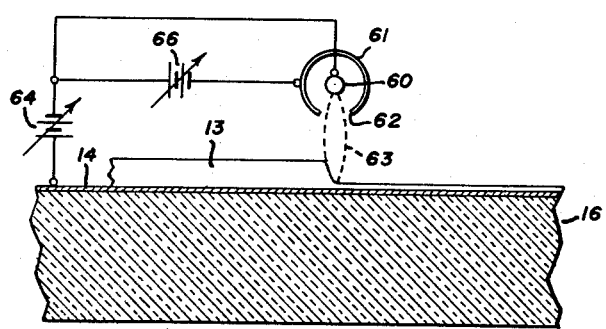
FIGURE 3 is an enlarged partly diagrammatic partially sectionalized view of a portion of the structure shown in FIGURE 2.

As best shown in FIGURE 3 the sheet beam of electrons 63 impinging on the fluid layer serves to thin the layer to a desired thickness of the order of for example 6–20 microns, and which thickness may be readily controlled by varying the accelerating potential of the anode 14 with respect to the cathode 60 or varying the intensity of emission from the cathode 60 by means of the adjustable bias supply 66 for grid 61. The landing of the electrons on the medium 13 in a sheet or area extending generally transverse to the direction of movement of medium 13 also provides in effect an electronic "doctor blade" which insures extreme smoothness and freedom from extraneous surface disturbances or deformation of the fluid layer as it moves into the deformation producing charge deposition area 15. As best shown in FIGURE 3, the sheet beam preferably has a length, or dimension transverse to the direction of movement of the deformable medium, such that the smoothed and thickness-controlled portion of the deformable medium 13 is somewhat wider than the raster area. This allows for some disturbance or change in thickness around the side edges of the smoothed portion, as illustrated at 69, 70, without such disturbances progressing into and deleteriously affecting the portion of the deformable medium in the area 15.

The invention is not limited to a deformable medium of any particular chemical composition, and various viscous materials may be used for the deformable medium within the contemplation of the invention. High radiation resistance under the conditions of electron bombardment which prevail is a desired property of the deformable medium, and a volume resistivity in the range of $10^{10}$ to $10^{14}$ ohm-centimeters and a viscosity of 100 to 50,000 centistokes while in the charge deposition area 15 is a desirable property of the deformable medium. Various chemical compositions have been employed successfully as deformable media in systems to which the present invention relates, such as for example methyl silicones, methyl phenyl silicones, polybenzl benzene, and polybenzl toluene. Additional exemplary materials are described more fully in U.S. Patent 2,943,157 commonly assigned herewith.

It is also contemplated that the deformable medium may, before passing beneath electron beam 63, be of much higher viscosity than desirable for suitable deformation in the raster area, and the heating effects from electron bombardment of beam 63 and thermionic emitter 60 may serve the additional purpose of heating and thereby suitably lowering the viscosity of the deformable medium, just before it enters the area 15, to provide desired deformation characteristics while in the area 15. The transfer of heat to the medium can be controlled to achieve the desired viscosity. Such control can be effected by any suitable means as for example, by selecting a particular spacing of the thermionic emitter 60 from the deformable medium. Similarly, the temperature of the emitter 60 can be controlled by controlling the resistance heating in accordance with standard techniques such as for example by selecting a material for the emitter 60 which has a particular resistance value or by proper selection of the source 68. In addition to its thickness regulating function, the emitter 60 may likewise serve as the heater for suitably softening and conditioning for deformation in area 15 a deformable medium on which an electric pattern has previously been applied while the medium was in a sufficiently viscous or solidified state to resist deformation.

To avoid excessive secondary electron emission from the medium 13 responsive to impingement of the primary electrons from cathode 60, and hence eliminate disturbances in the fluid surface which such secondary electron emission would cause, the potential difference between cathode 60 and anode 14 should preferably be greater than the second cross-over potential on the characteristic curve of secondary electron emission ratio versus anode potential for the particular medium 13 used. That is, the potential difference between cathode 60 and anode 14 should be such that the secondary emission ratio for electrons of beam 63 is less than 1.0. Such a potential difference of, for example 2 to 10 kv. has been found to provide satisfactory smoothness and thickness regulation, with currents in beam 63 in the range of 1 to 20 microamperes.

It will be appreciated by those skilled in the art that the invention may be carried out in various ways and may take various forms and embodiments other than the illustrative embodiments heretofore described. Accordingly it is to be understood that the scope of the invention is not limited by the details of the foregoing description, but will be defined in the following claims.

What I claim as new and desire to secure by Letters Patent of the United States is:

1. In a projection system including a deformable medium extending across an electric charge deposition area and electron beam means for applying a pattern of electric charge to said deformable medium in said charge deposition area to produce light diffracting deformations of said deformable medium, means for moving the deformable medium relative to said electron beam means to advance a fresh surface of the deformable medium into the charge deposition area, and means for directing a sheet electron beam into impingement with the surface of said deformable medium to smooth said deformable medium, said sheet electron beam impinging upon an area extending generally transverse to the direction of movement of said deformable medium and adjacent the leading edge of said charge deposition area.

2. In apparatus for bending light rays by deformation of a deformable medium in accordance with electric charge deposited thereon, and wherein relative motion of the deformable medium and source of electric charge is provided to advance a fresh surface of the deformable medium into the charge deposition area, means for smoothing the surface of the deformable medium before its entry into the charge deposition area comprising a thermionic electron emitter extending longitudinally in spaced generally parallel relation with the surface of said deformable medium and generally transverse to the direction of movement of said medium toward said charge deposition area, and electrode means associated with said emitter for controlling and focusing the electrons emitted therefrom into a sheet beam impingement on said deformable medium in an area extending generally transverse to the direction of movement of said medium and adjacent the leading edge of said charge deposition area.

3. Apparatus as defined in claim 2 wherein the current from said thermionic emitter is from 1 to 20 microamperes, and the relative potential accelerating electrons from said thermionic emitter to impingement on said deformable medium is from 2 to 10 kilovolts.

4. Apparatus as defined in claim 2 wherein said thermionic emitter includes a refractory metal filament and means for directly heating said filament by passage of electric current therethrough.

5. Apparatus as defined in claim 2 wherein said thermionic emitter includes a directly heated refractory metal filament disposed in heat transferring relation with said deformable medium, and wherein means is provided for varying the temperature of said refractory metal filament to regulate heat transfer to said deformable medium.

6. In apparatus for bending light rays by deformation of a deformable medium in accordance with electric charge deposited thereon, and wherein relative motion of the deformable medium and source of electric charge is provided to advance a fresh surface of the deformable medium into the charge deposition area, a thermionic emitter extending across the surface of said medium in spaced relation therewith adjacent the leading edge of said charge deposition area, means for heating said thermionic emitter sufficiently to produce electron emission therefrom, means for directing electrons emitted from said thermionic emitter into impingement on said deformable medium in an area extending generally transverse to the direction of movement of said deformable medium toward said charge deposition area, and means for controlling the transfer of heat from said thermionic emitter to said deformable medium to regulate the viscosity of said deformable medium before its entry into said charge deposition area.

References Cited by the Examiner
UNITED STATES PATENTS

| | | | |
|---|---|---|---|
| 2,391,450 | 12/45 | Fischer | 178—7.5 |
| 2,391,451 | 12/45 | Fischer | 178—7.5 |

DAVID G. REDINBAUGH, *Primary Examiner.*